(12) United States Patent
Davis et al.

(10) Patent No.: US 6,905,551 B2
(45) Date of Patent: Jun. 14, 2005

(54) METHOD AND APPARATUS FOR CLEANING THE FRONT SURFACE OF A MOUNTED LENS

(75) Inventors: Michael D. Davis, Hamlin, NY (US); Mark S. Carducci, Rochester, NY (US); Stephen P. North, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 273 days.

(21) Appl. No.: 10/308,691

(22) Filed: Dec. 3, 2002

(65) Prior Publication Data

US 2004/0103916 A1 Jun. 3, 2004

(51) Int. Cl.[7] .................................................. B08B 7/04
(52) U.S. Cl. ........................... 134/6; 134/18; 134/25.5; 134/26; 134/42; 396/6
(58) Field of Search .......................... 396/6; 134/6, 18, 134/25.5, 26, 42

(56) References Cited

U.S. PATENT DOCUMENTS

| | | | |
|---|---|---|---|
| 4,842,132 A | 6/1989 | Wells | 206/229 |
| 5,400,098 A | 3/1995 | Rydelek | 354/288 |
| 5,406,413 A * | 4/1995 | Mogamiya | 359/511 |
| 5,608,486 A | 3/1997 | Takagi et al. | 396/6 |
| 5,615,395 A | 3/1997 | Komaki et al. | 396/6 |
| 6,343,185 B1 | 1/2002 | Aoshima et al. | |
| 2002/0139394 A1 * | 10/2002 | Bronson | 134/6 |
| 2004/0103916 A1 * | 6/2004 | Davis et al. | 134/6 |

FOREIGN PATENT DOCUMENTS

| | | |
|---|---|---|
| JP | 08-122979 | 5/1996 |
| JP | 10-062915 | 6/1998 |
| JP | 2000-131807 | 5/2000 |
| JP | 2000-155395 | 6/2000 |
| JP | 2001-75241 | 3/2001 |

* cited by examiner

*Primary Examiner*—Sharidan Carrillo
(74) *Attorney, Agent, or Firm*—Robert Luke Walker

(57) ABSTRACT

In a method and apparatus for cleaning the front surface of a mounted lens a web is moved to a lowered position against the lens. A first segment of the web is then slackened. The first segment of web is then rubbed against the lens. Following the rubbing the web is pulled taut while the web is still in the lowered position. A second segment of web can be wiped against the lens while the web is held taut. The first segment can be wet and the second segment dry.

15 Claims, 13 Drawing Sheets

METHOD AND APPARATUS FOR CLEANING THE FRONT SURFACE OF A MOUNTED LENS

FIELD OF THE INVENTION

The invention relates to photography and photographic equipment and more particularly relates to a method and apparatus for cleaning the front surface of a mounted lens.

BACKGROUND OF THE INVENTION

During use, the front surfaces of the taking lenses of one-time-use cameras are subject to contamination by foreign substances. Lenses can be replaced when a one-time-use camera is recycled, or, alternatively, contamination can be removed by a cleaning process.

A variety of cleaning processes are known. U.S. Pat. No. 5,400,098 and U.S. Pat. No. 5,608,486 disclose one-time-use cameras, in which the taking lenses are removed when the film cartridge is removed. Cleaning of separated lenses is fairly straight-forward; however, lens separation adds a risk of loss or damage of the separated lenses and opens up the area of the camera behind the lens to a risk of contamination.

Manual methods of cleaning front surfaces of lenses are well known. U.S. Pat. No. 4,842,132 discloses an example of a device and kit for such manual cleaning. Manual cleaning is slow and inefficient.

U.S. Pat. No. 5,615,395 discloses apparatus and methods for cleaning the front face of a flash reflector cover. In a cleaning head, fabric tape extends over a roller. The roller is lowered against the front face of the flash reflector cover and then the cleaning head or just the cleaning tape is moved back and forth to wipe the front face. Cleanser liquid is applied to the front face or the tape prior to the wiping. During wiping the fabric tape going to and from the cleaning head is kept under tension. Since the front face of the flash reflector cover is generally flat, this approach is not directly applicable to cleaning the curved front surface of a taking lens.

Japanese patent reference JP 10-62915, published Mar. 6, 1998, discloses a method and apparatus for cleaning the front surface of a mounted taking lens. (The term "mounted lens" and like terms are used herein to refer to a lens that has an exposed front surface, but is otherwise held within and enclosed by a camera body or other support structure. A web is supported by rollers over the lens. A rotary head having a flexible brush, is lowered against the web. The brush presses the web down against the lens. The head (or the mounted lens) is rotated wiping the lens. The web is clamped upstream and downstream of the head, prior to rotation. According to U.S. Pat. No. 6,343,185 (at col. 1, lines 49–61), the method and apparatus of JP 10-62915 have the shortcoming that the entirety of the cleaning device must be rotated or the exposure unit on a pallet must be rotated.

Japanese patent reference JP 2001-75241, published Mar. 23, 2001, discloses another method and apparatus for cleaning the front surface of a mounted taking lens. The lens is subjected to high pressure cleaning air and a brush and is then wet by a separate head. Separately, a web is trained over a suction tube by a pair of rollers. The web is moved along the surface of the lens and the moisture is sucked away through the web. The area of contact of the web and the lens is illustrated as being small.

U.S. Pat. No. 6,343,185 discloses a lens cleaning apparatus and method in which a small cleaning head presses a cleaning tape against a taking lens of a one-time-use camera. Only the small cleaning head is rotated relative to the lens. (Cleaning liquid is earlier applied.) Rollers for the cleaning tape are not rotated. The cleaning tape is slackened prior to the rotation and the tape is brought into contact with the taking lens, by the lowering of a cleaner holder plate toward the camera. The cleaner holder plate includes the parts of the lens cleaner other than a set of rollers adjoining the camera. The cleaning tape is clamped upstream and downstream of the cleaning head when the cleaner holder plate is lowered, to keep the loosened part from being retightened by supply and winder reels. Viewfinder lens cleaning is also disclosed. This approach has the advantage that the rotated cleaning head is small. On the other hand, there is the shortcoming that the lowering of the tape against the lens and the slackening of the tape occur as a result of the same movement of the cleaner head plate. The requirements of one constrains the other. For example, wiping is limited to use of a slackened tape.

It would thus be desirable to provide improved methods and apparatus for cleaning a front surface of a mounted lens, in which slackening and tightening a cleaning web does not require simultaneously lowering or raising the cleaning web.

SUMMARY OF THE INVENTION

The invention is defined by the claims. The invention, in its broader aspects, provides a method and apparatus for cleaning the front surface of a mounted lens, in which a web is moved to a lowered position against the lens. A first segment of the web is then slackened. The first segment of web is then rubbed against the lens. Following the rubbing the web is pulled taut while the web is still in the lowered position. A second segment of web can be wiped against the lens while the web is held taut. The first segment can be wet and the second segment dry.

It is an advantageous effect of the invention that an improved methods and apparatus are provided for cleaning a front surface of a mounted lens, in which slackening and tightening a cleaning web does not require simultaneously lowering or raising the cleaning web.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
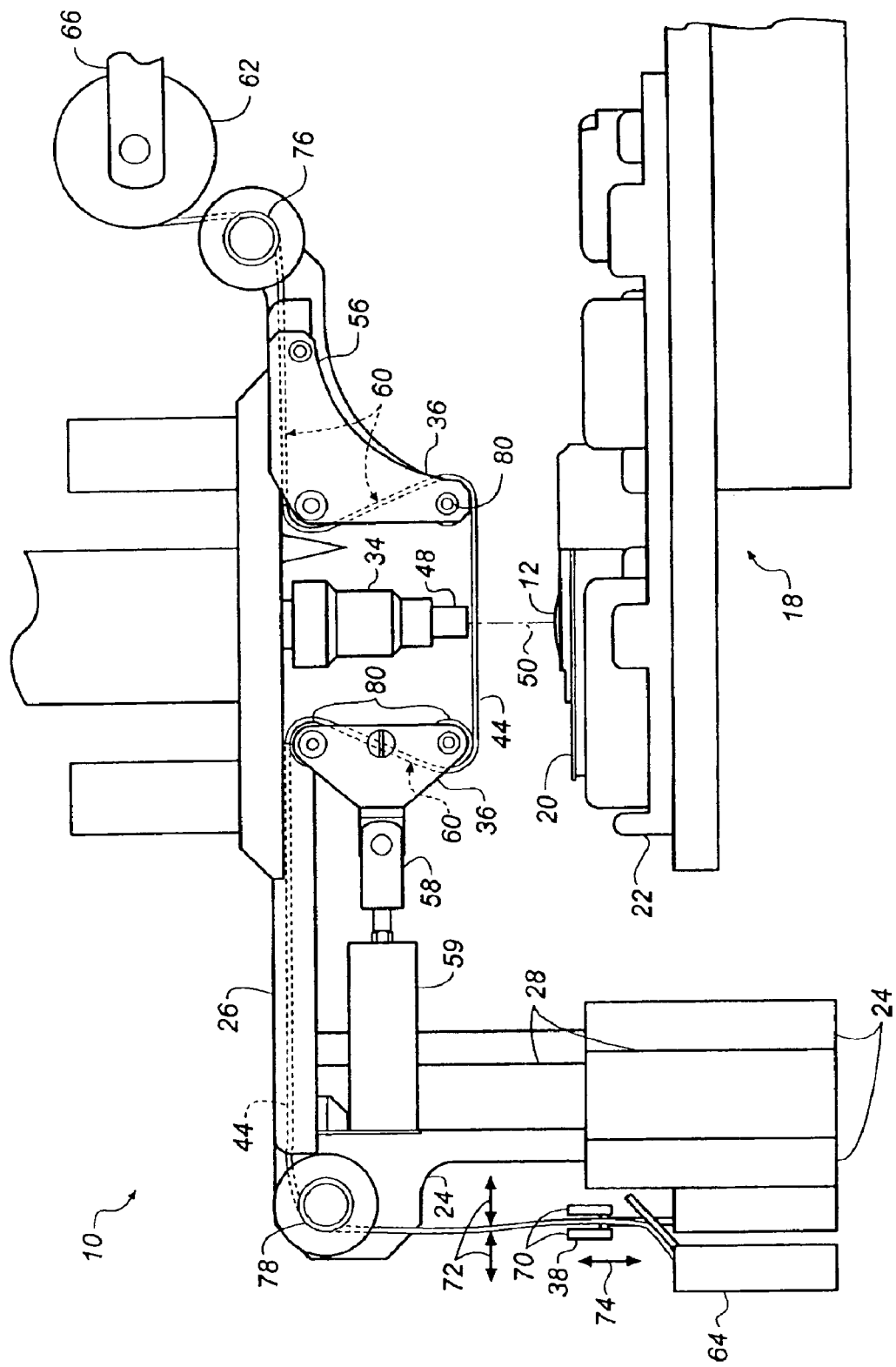
FIG. 1 is a semi-diagrammatical side view of an embodiment of the apparatus. Also shown is part of a turntable.

The apparatus 10 washes and wipes the front surface of a mounted lens 12. The lens 12 is moved into and out of a work site 14 (indicated by dashed line box in FIG. 3) by a transporter 18. In the embodiment shown in the figures, lenses 12 are mounted within one-time-use cameras 20 and only the front surfaces of the lenses 12 are exposed to the outside environment. The apparatus and methods are also suitable for lenses mounted in other types of cameras, in other optical equipment, and even in temporary holders (not shown).

Figure 3:
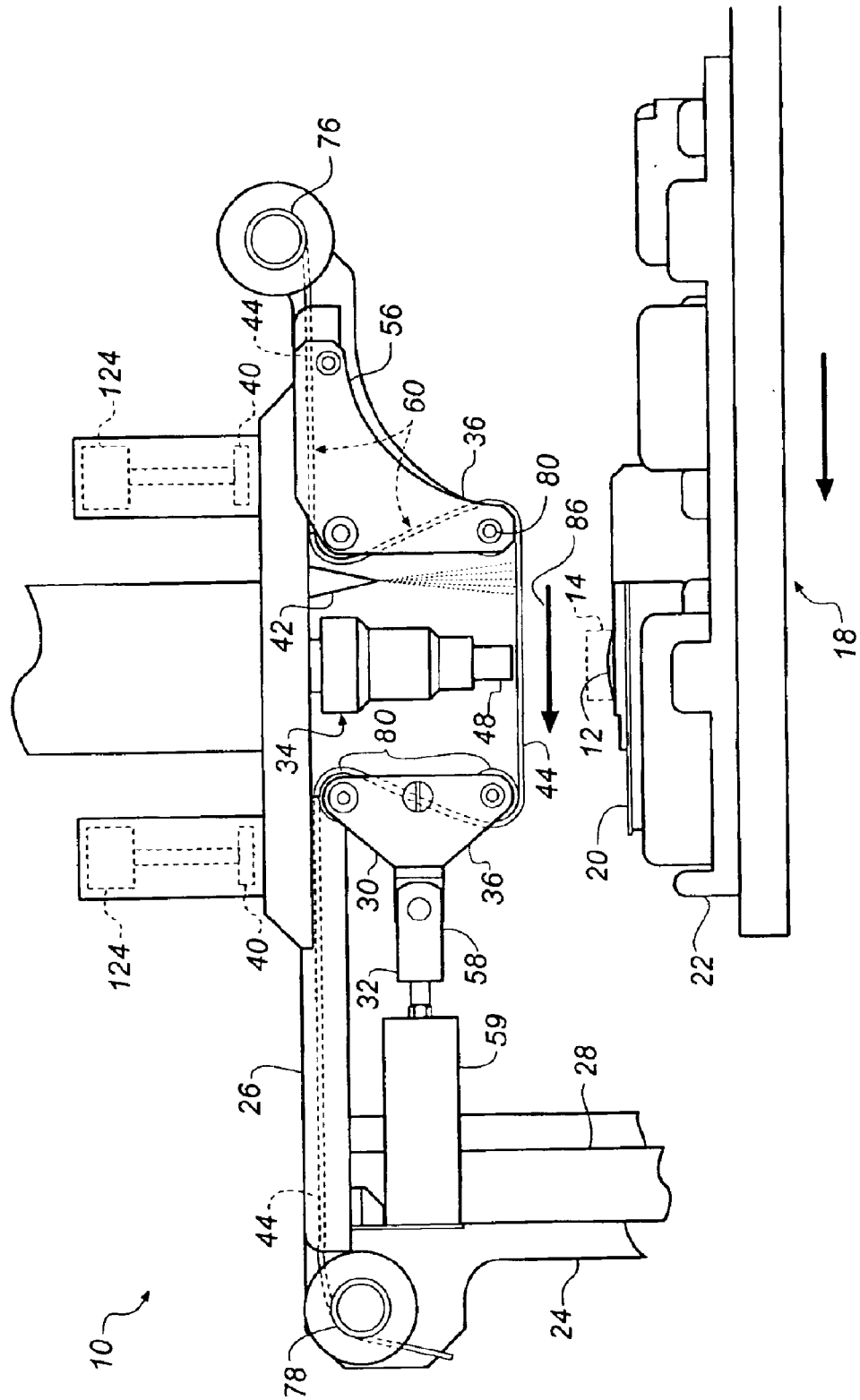
FIG. 3 is a partial side view of the apparatus of FIG. 1. The carriage is in raised position. The outfeed arm of the guide is in a web tightening position. The clamps are in released position. The probe is in retracted position. The spraying of cleaning liquid from the spray head is shown. Advancement of the mounted lens on the transporter is indicated by the lower arrow. Advancement of a first segment of the web under the probe is indicated by the upper arrow.

The mounted lenses 12, when located within the work site 14 shown in FIG. 3, are restrained in a uniform position and orientation relative to the apparatus 10 by the body of the camera 20. The relative location and orientation of the lenses 12 is predetermined for a known camera or other mount or can be determined immediately before cleaning either manually or automatically.

The apparatus 10 is used with a transporter 18. The manner in which the mounted lenses 12 are transported is not critical, other than that the mounted lenses 12 are moved to and from the work site 14 defined by the apparatus 10. Transport can be manual or automated and, if automated, can be synchronous or asynchronous relative to other automated procedures. The transporters 18 shown are a rotary table, in FIGS. 1 and 3–11, and a linear conveyor, in FIG. 2. Each of these transporters 18 can carry a series of pallets 22, each pallet 22 having space for one or more cameras 20. Pallets 22 having space for two cameras are shown in some figures.

The apparatus 10 has a base 24 and a carriage 26 that is movable up and down relative to the base 24 by a carriage drive mechanism 28. (Directional terms, such as "up", "down", and the like, are used in a relative sense and are inclusive of, but not limited to, corresponding absolute directions.) The drive mechanism 28 is joined to the base 24 and carriage 26 and provides motive force and guidance for the relative up and down linear movement of the carriage 26. In the embodiment illustrated, the carriage 26 is movable between a lowered position and a raised position. Additional positions can be provided as needed.

The elevating mechanism 28 for the carriage 26 can be a simple pneumatic cylinder. The nature of the carriage drive mechanism 28 and other linear and rotational drive mechanisms used in the apparatus 10 is not critical. Motive power can be supplied electrically, hydraulically, pneumatically, by other means, or by a combination of these. Guidance of movements can be by separate supports (not illustrated) or an inherent feature of a particular drive mechanism. Examples of linear drives include an electric motor driving the pinion of a rack and pinion or a gear or belt mechanism or a linear electric motor.

The carriage 26 is configured so as to support other components and to meet the requirements of a particular carriage drive mechanism 28. In the embodiment shown in the figures, the carriage 26 is rigidly cantilevered from the carriage drive mechanism 28.

Mounted to the carriage 26 are a turret 34, a guide 36, a web transport 38, a pair of web clamps 40, and a spray nozzle or other applicator 42 for cleaning liquid. A web 44 is held by the web transport 38 and guide 36.

The turret 34 extends downward from the carriage 26 toward the transporter 18. The turret 34 has a main portion 46 that narrows to a probe 48 at the lower end. The turret 34 moves with the carriage 26. The probe 48 can also move up and down relative to the carriage 26 and the rest of the turret 34, along a probe axis 50, between a retracted position and an extended or contact position. A linear drive mechanism 52 supplying this motion can be incorporated in the turret 34

Figure 2:
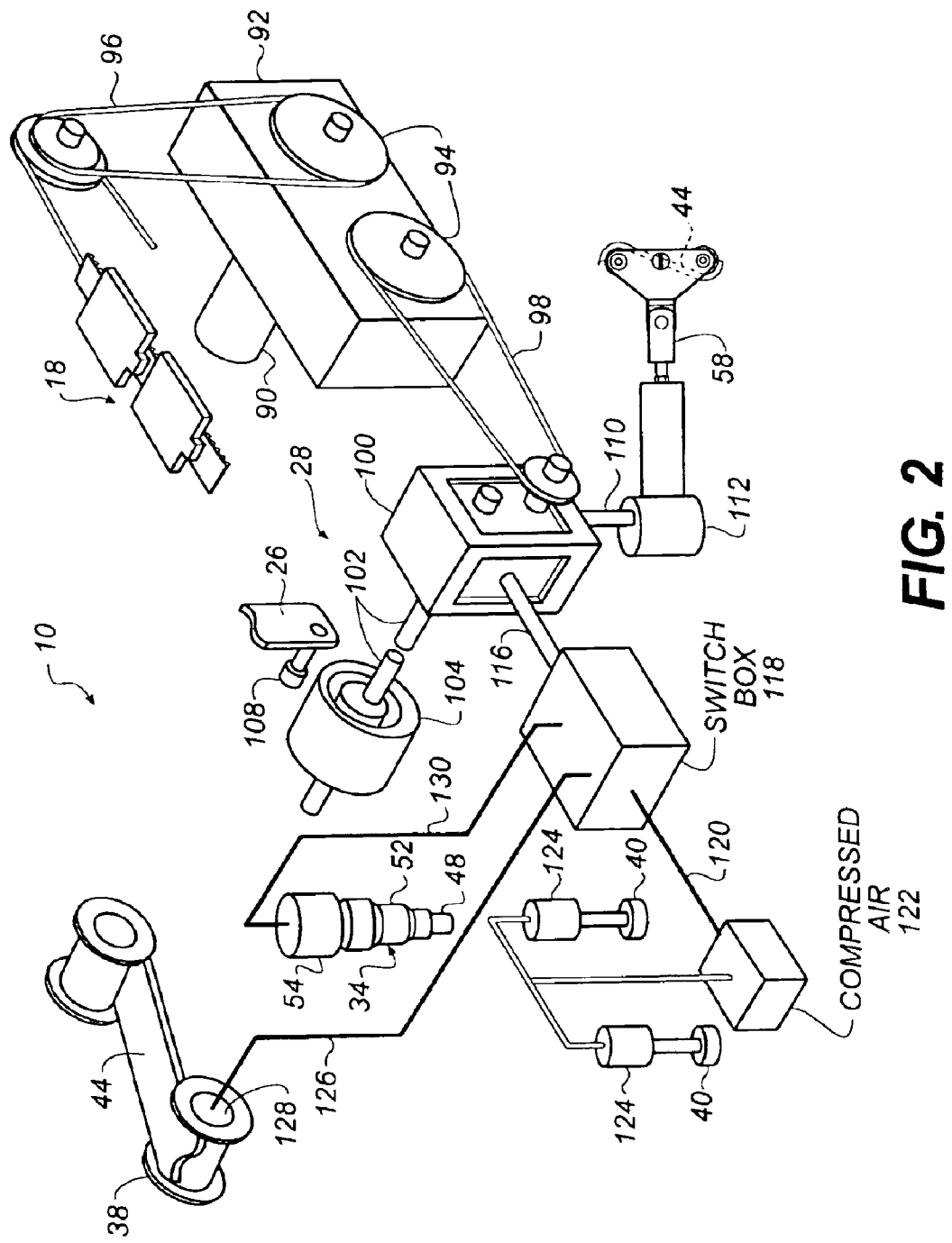
FIG. 2 is a semi-diagrammatical view of another embodiment of the apparatus. Only powered components and related structures are shown. (Pallets and cameras are not shown.) A conveyor replaces the turntable shown in FIG. 1.

(as shown in FIG. 2) or the linear drive mechanism can drive the entire turret upward and downward (not shown).

The probe 48 is also pivotable, back and forth, about the probe axis 50. This pivoting motion is provided by a rotary drive mechanism 54 that is mounted to the carriage 26 and pivots the entire turret 34 (as shown in FIG. 2) or is incorporated in the turret (not shown). The pivoting motion twists the web 44. The maximum extent of pivoting is determined by the ability of the web 44 to quickly recover from twisting. A convenient extent is about 45 degrees in either direction.

Figure 15:
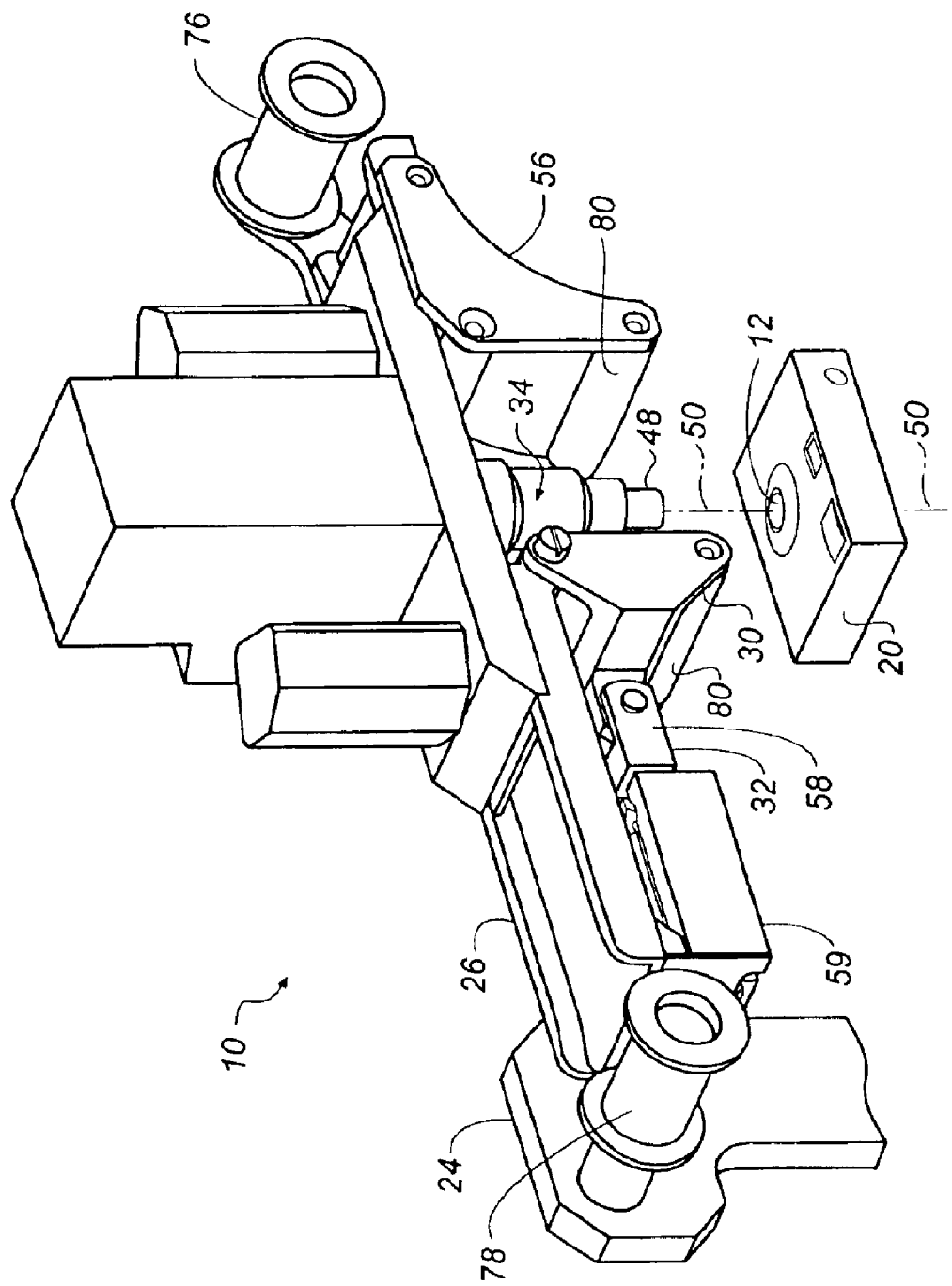
FIG. 15 is a perspective view of the carriage of the apparatus of FIG. 1.

In the contact position, the probe 48 contacts the web 44 and holds the web 44 against the outer surface of the mounted lens 12. The probe 48, when located in the contact position, defines the work site 14 within which the lens 12 is cleaned. The probe 48, when located in the contact position, further defines the position and orientation the lens 12 must attain in order to be contacted by the web 44 during cleaning. In the illustrated embodiments, the uniform position of a lens 12 within the work site 14 is one in which the optical axis of the lens 12 is coincident with the probe axis 50 (indicated diagrammatically in FIG. 15).

The probe 48 is spaced from the lens 12, in the contact position, by the compressed thickness of the web 44. The probe 48 can be rigid or resilient. It is convenient to provide for some resiliency in the turret 34, for example, by use of a resilient probe 48 or by spring mounting the turret 34 or probe 48 relative to the carriage 26, since this provides some protection against accident damage during set-up and accommodates variations in the vertical positions of the lenses 12.

The probe 48 is matched to the shape of the lenses 12. In the illustrated embodiments, the probe 48 has the shape of a downwardly directed concave socket (not illustrated). The area that the web 44 wipes is larger than the probe 48; therefore, the diameter of the probe 48, in a direction perpendicular to the probe axis 50, can be less than the diameter of the lens 12. This provides for wiping of the entire lens 12. A further reduction in probe 48 size can be provided, if the entire lens 12 does not need to be wiped. For example, an outer margin of the lens 12 may be covered by another part during use, and, thus, be less subject to contamination.

The web 44 is woven or non-woven fabric and absorbent for a selected cleaning liquid. The web 44 has sufficient tensile strength, while dry and wet with the cleaning liquid, to resist tearing and excessive stretching while in use in the apparatus 10. Stretching is excessive if it interferes with transport of the web 44 or another apparatus 10 function. The width of the web 44 is a function of the size of the lenses 12 to be cleaned and the diameter of the probe 48. A web 44 that is narrower than the probe 48 can be difficult for the probe 48 to grip and is undesirable. A web 44 that is as wide or wide than the diameter of the lens 12 is readily gripped by the probe 48 and wipes a large area. A suitable width of the web 44 and other characteristics, such as thickness, tensile strength, and softness can be readily determined experimentally using models of a type of cameras or otherwise mounted lenses for which the cleaning is intended.

The guide 36 has opposed infeed and outfeed arms 56,58 that are joined to and extend downward from the carriage 26. The arms 56,58 are positioned at opposite sides of the turret 34. The guide 36 moves with the carriage 26 between the raised and lowered positions. The arms 56,58 define a web path 60 that crosses the work site 14 when the guide 36 is in the lowered position and is spaced from the work site 14 when the guide 36 is in the raised position.

One of the arms 56,58 is movable relative to the other arm 58,56, between a web tensioning position and a web slackening position. For convenience, movement of one of the arms is generally addressed in the following discussion, in relation to the outfeed arm 58. In the embodiments shown in the figures the movable arm is the outfeed arm 58. It will be understood that the infeed arm 56 can be moved rather than the outfeed arm 58 or both arms 56,58 can move.

The web 44 is threaded about the guide 36 along the web path 60. The web 44 is taut when the outfeed arm 58 is in the web tensioning position and slack when the outfeed arm 58 is in the web slackening position.

Figure 6:
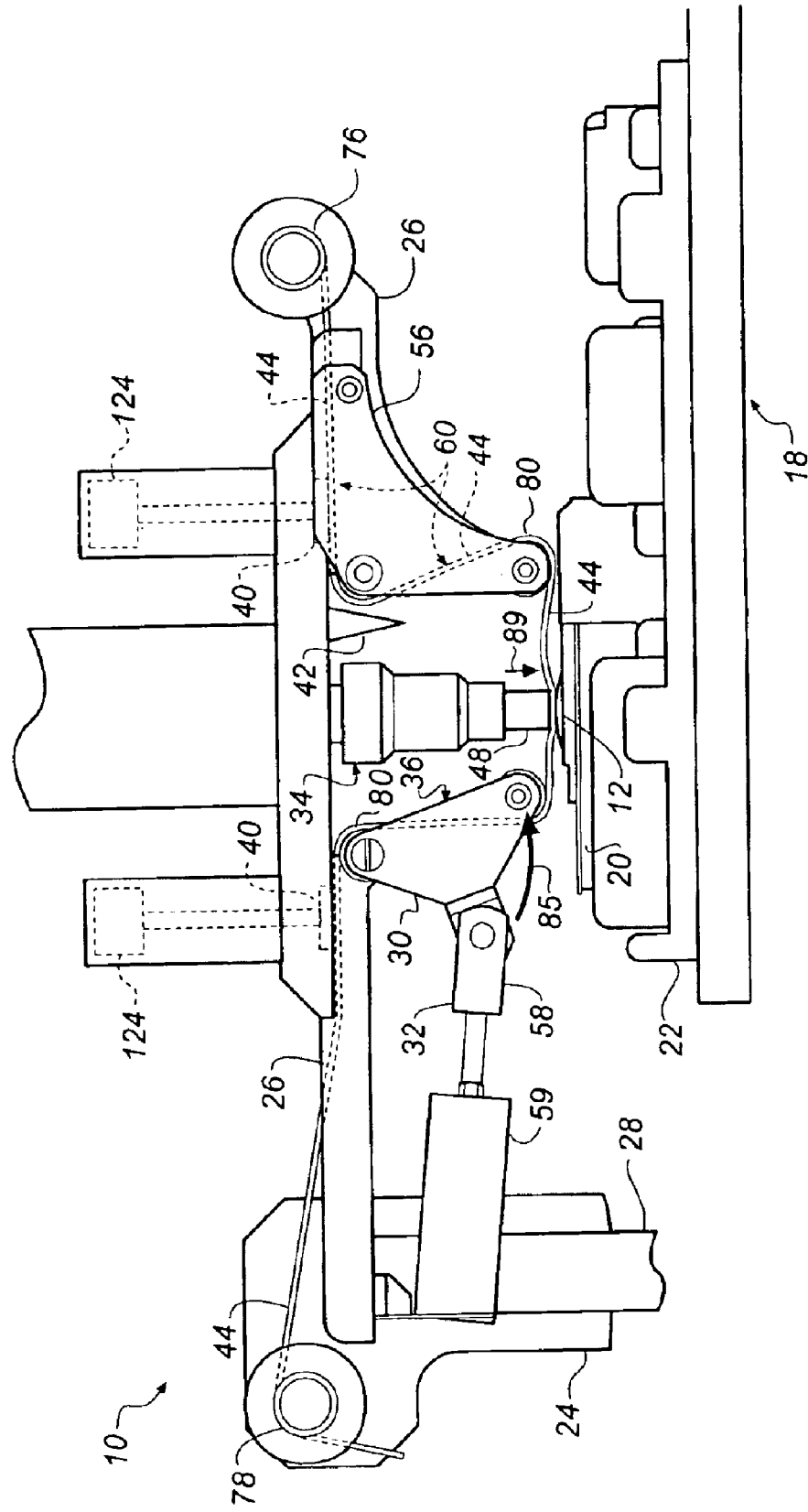
FIG. 6 is the same view as FIG. 5, except that the outfeed arm of the guide is in the web slackening position and the probe is in the extended position. The carriage remains in the lowered position. The clamps remain in the clamping position. The steps of moving the outfeed arm from the web tightening position to the web slackening position and the step of moving the probe from the retracted position to the extended position are indicated by a curved arrow and a downwardly directed straight arrow, respectively.
Figure 7:
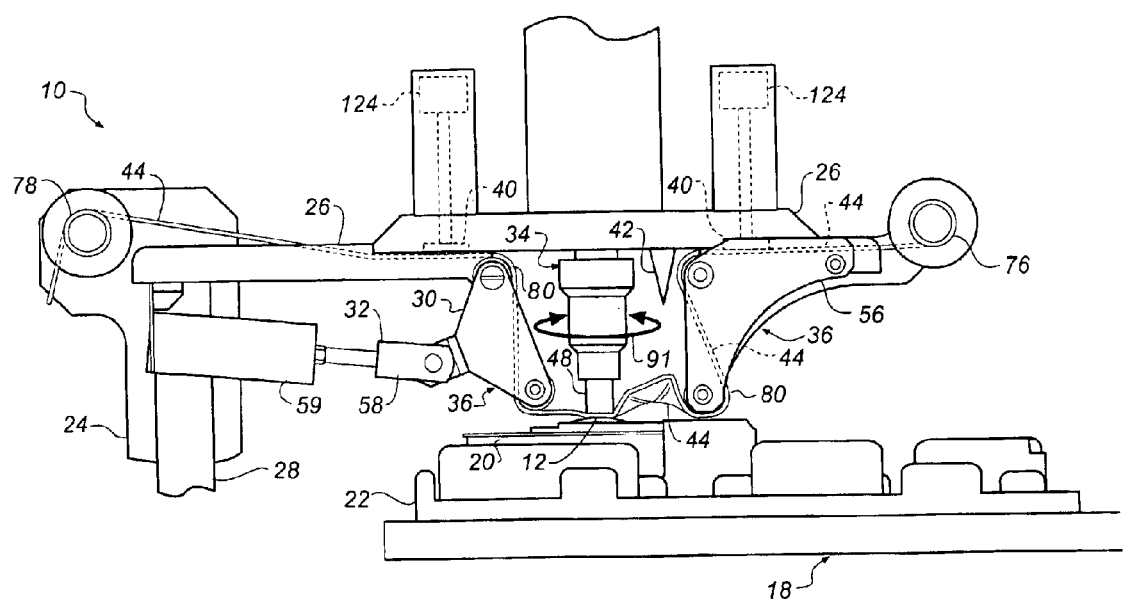
FIG. 7 is the same view as FIG. 6, except that the part of the web adjoining the probe is shown in a gathered condition resulting from a pivoting of the probe. The carriage remains in the lowered position. The probe remains in the extended position. The clamps remain in the clamping position. The outfeed arm of the guide remains in the web slackening position. The rotation of the probe is indicated by a double-headed curved arrow.
Figure 8:
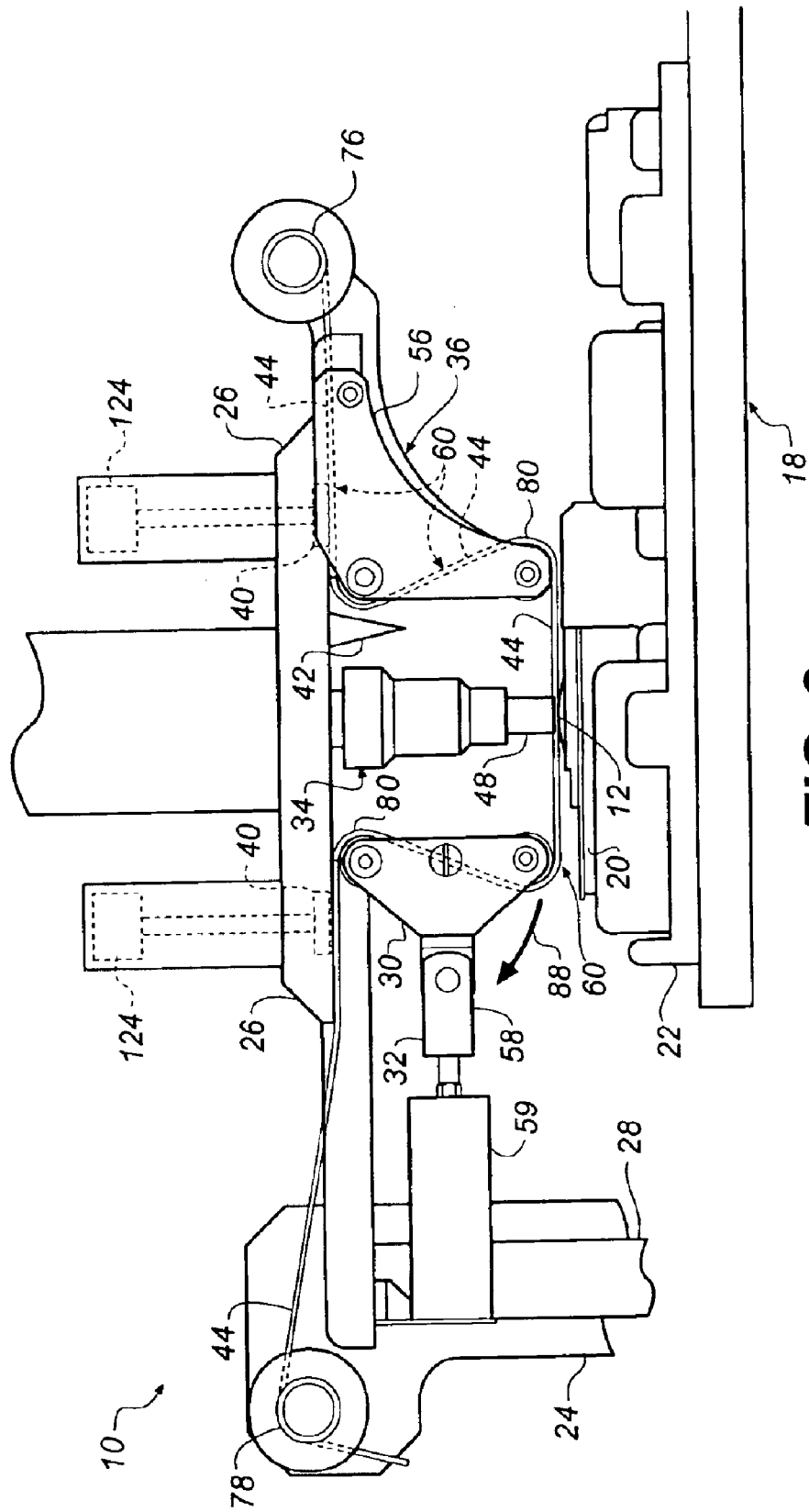
FIG. 8 is the same view as FIG. 7, except that the outfeed arm of the guide is in the web tightening position. The probe remains in the extended position. The carriage remains in the lowered position. The clamps remain in the clamping position. The movement of the outfeed arm from the web slackening position to the web tightening position is indicated by a curved arrow.

In the illustrated embodiment, the arm movement is a pivoting of the lower end 30 of the outfeed arm 58 toward the probe 48 (see FIGS. 6–8). The pivoting is about a connector between the lower end 30 of the arm 58 and the upper end 32 of the arm 58, due to the extension of a pneumatic cylinder 59 joined to the upper end 32. This is particularly advantageous, because it allows for the continued guidance of the web 44 while the web 44 is slackened. The movement can be pivoting or translation or both by one or both arms 56,58. The movement of the arm or arms 56,58 slackens the web 44 by increasing the length of the web path 60. The increase in length is in the range of about 1 to about 2 times the diameter of the probe 48.

A web transport 38 is joined to the guide 36. The web transport 38 moves the web 44 intermittently through the guide 36 as needed by the different steps of a cleaning procedure and in synchrony with the operation of other components. The apparatus 10 is capable of moving the web 44 independent of the position of the guide 36. The web 44 can be transported through the guide 36 when the guide 36 is in the raised position and in the lowered position.

The web transport 38 includes a web supply 62 and a web return 64 that receives used web 44. The web supply 62 and web return 64 can be joined to and movable with the guide 36 or can be separate from the guide 36. The web supply 62 and web return 64 can be configured as desired, as convenient for any particular usage. For example, in the embodiment shown in FIG. 1, the web supply 62 is a coil wrapped around a reel held by a support structure 66 that is separate from the carriage 26. An example of another type of web supply 62 is a folded stack of web 44. In the embodiment shown in FIG. 1, the web return 64 is a bin, into which used web 44 is dropped. Another example of a web return 64 is a take-up reel that coils used web 44. Web 44 can be used once or reused. In the latter case, the web return 64 can be part of a resupply loop (not illustrated) that continues back to the web supply 62. Used web 44 could be cleaned as a part of a resupply loop.

The web transport 38 includes one or more drive members that impel the web 44 through the guide 36. Multiple drive members and movements of members can be synchronized mechanically by a geartrain (not shown) or can be synchronized by operation of a control unit, such as an appropriately programmed microprocessor, or can be synchronized by a combination of mechanical and computer synchronization.

In the embodiment illustrated in FIG. 1, the drive member of the web transport 38 is a parts feeder, which has a pair of opposed jaws 70. The jaws 70 are moved together to grip the web 44 and apart to release the web 44, as indicated by the arrows 72 in FIG. 1. The pair of jaws 70 is moved down with the gripped web 44 and then back up when the web 44 is released, as indicated by the double-headed arrow 74 in FIG. 1. The released web 44 drops directly or along a chute into the web return 64. Movement of the parts feeder 68 can be provided by pneumatic cylinders, electric motors, or the like. In the embodiment of FIG. 1, the web transport 38 includes unpowered entrance and exit rollers 76,78. The entrance roller is mounted to the carriage 26. The exit roller is mounted to the base 24. Both rollers 76,78 could, alternatively, be mounted to the carriage. The guide 36 includes fixed (immobile) guide bars 80 that redirect the web 44. The guide bars are positioned so as to lead the web 44 down from the rollers 76,78 and across a gap between the two guide arms 56,58. The turret 34 is positioned over the web 44 in the gap. In the embodiment shown in FIG. 2, the drive member 68 of the web transport 38 is a powered exit roller.

Other examples, of drive members 68 can include one or more rollers of the guide 36 and/or a motorized belt (not shown) positioned downstream from the guide 36. The belt can closely adjoin a platen and deliver the web 44 to the exit roller. The guide bars 80 can be made to rotate and can be powered or unpowered. Slide guides and idlers can be provided as desired and an encoder feedback system can be included to control the lengths of web 44 fed by the web transport 38.

In the embodiments shown, the applicator 42 is a spray nozzle that is positioned so as to direct a spray of cleaning liquid toward the web 44, as shown in FIG. 3. A pressurized cleaning liquid source (not shown) supplies cleaning liquid to the spray nozzle 42 under pressure. The cleaning liquid is dispensed when the nozzle 42 is actuated (illustrated in FIG. 3. A convenient location for the spray nozzle 42 is on the carriage 26, between the arms 56,58 of the guide 36. The spray nozzle 42 is preferably also positioned at a separation from the probe 48, such that the dispensed cleaning liquid can strike the web 44 at a distance from the probe 48. This helps deter any build up of residue on the probe 48. Such build up would impair uniform cleaning. The spray pattern is sized to prevent overspraying and the spray volume is limited to prevent excessive wetting and a risk of smearing or dripping. It is currently preferred that the sprayed cleaning liquid only dampen the web 44, that is, be insufficient in amount to utilize the full moisture retention capacity of the sprayed area of the web 44. Other types of applicators can be used instead of a spray nozzle to apply liquid cleaner by dripping or wiping or in some other manner.

The web 44 can be moistened with cleaning liquid by other means, such as wiping, immersion, and dripping of the cleaning liquid onto the web 44. The cleaning liquid can also be placed on the lens 12 rather than the web 44, but this is not currently preferred, since there is a risk of seepage under the lens 12. The cleaning material is referred to here as a liquid, but this term is inclusive of gels and the like.

The pair of web clamps 40 are disposed in the web path 60 upstream and downstream from the arms 56,58. The web clamps 40 are releasably switchable to a clamped state, in which the clamps isolate a portion 84 of the web 44 from the web supply 62 and web return 64. The isolated portion 84 (best seen in FIGS. 12–14) is on the web path 60 extending through the guide 36. The clamps 40 do not effect the guide 36. Thus, the outfeed arm 58 is movable relative to the second arm 56 while the clamps 40 are in the clamped state.

Referring now to FIGS. 3–11, in the method, a pallet 22 having a camera 20 with the mounted lens 12 is moved by the transporter 18 (indicated by arrow) into the worksite defined by the probe 48 of the apparatus 10. In FIG. 3, the carriage 26 is initially in the raised position and does not interfere with movement of the camera and lens 12. The web 44 is advanced (indicated by arrow 86) to provide a fresh, unused segment of web 44, concurrent with, before, or after the movement of the mounted lens 12 on the transporter 18. The fresh segment can be spaced from an earlier used length of web 44 by an unused length that acts as a spacer or buffer between the fresh segment and previously used lengths of the web 44. The nozzle 42 is actuated and cleaning liquid is sprayed onto a first segment of the web 44, when the fresh segment of web 44 is pulled underneath. The web 44 can be moving or stopped when the spraying occurs. The dampened segment of web 44 is then advanced under the probe 48.

Figure 4:
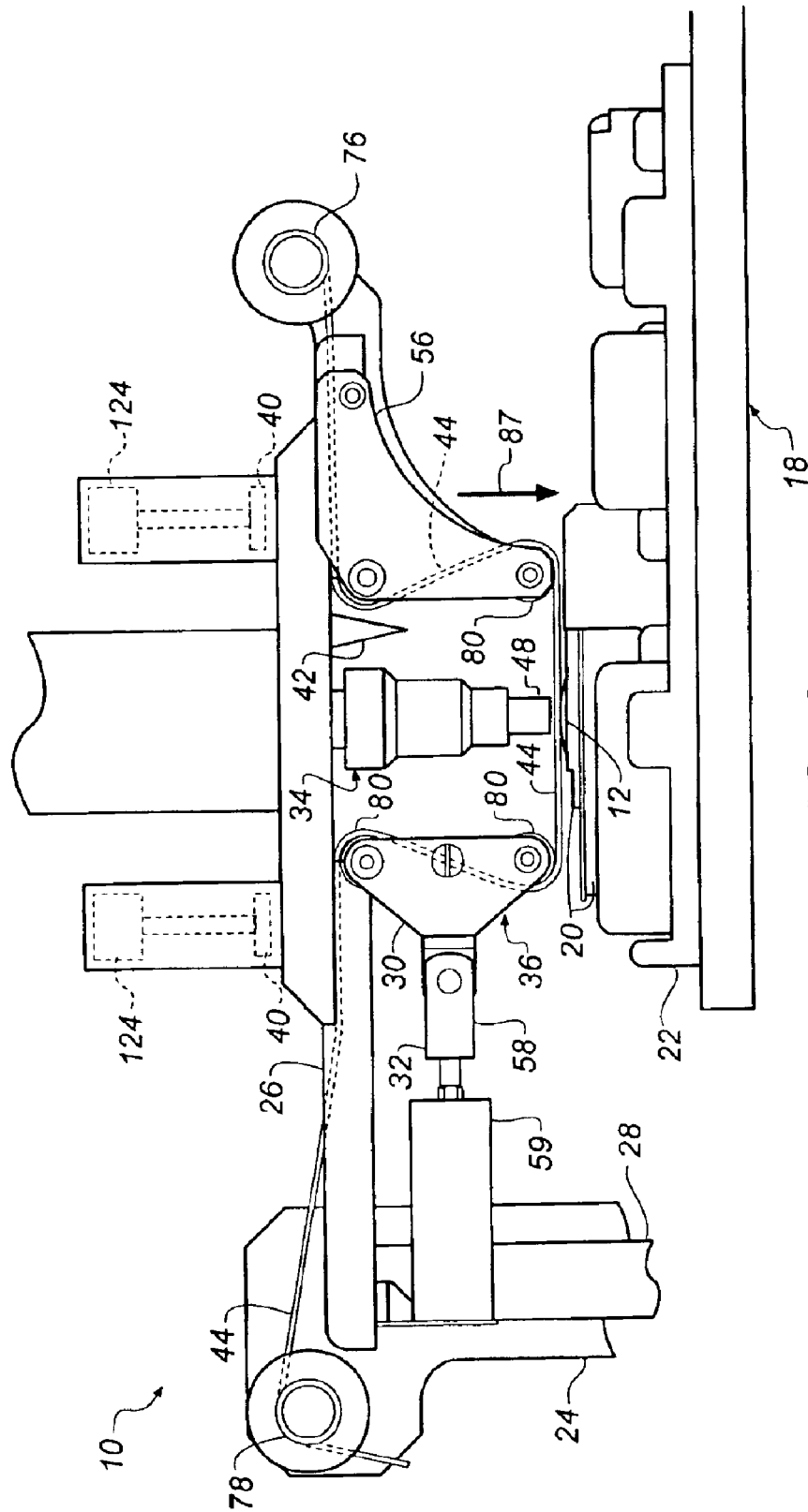
FIG. 4 is the same view as FIG. 3, except that the carriage is shown in the lowered position. The outfeed arm of the guide remains in the web tightening position. The clamps remain in the released position and the probe in the retracted position. The lowering step is indicated by a downwardly directed arrow.

Referring to FIG. 4, when the transport moves the mounted lens 12 into the work site 14, the carriage 26 is lowered (indicated by arrow 87) from the raised position to the lowered position. The advancing of the web 44 and spraying of the cleaning liquid can occur during the lowering of the carriage 26, or before or after. In the lowered position, the first segment of web 44 is in contact with the lens 12. The probe 48 remains in a retracted position at this time, in spaced relation to the web 44 and lens 12.

Figure 5:
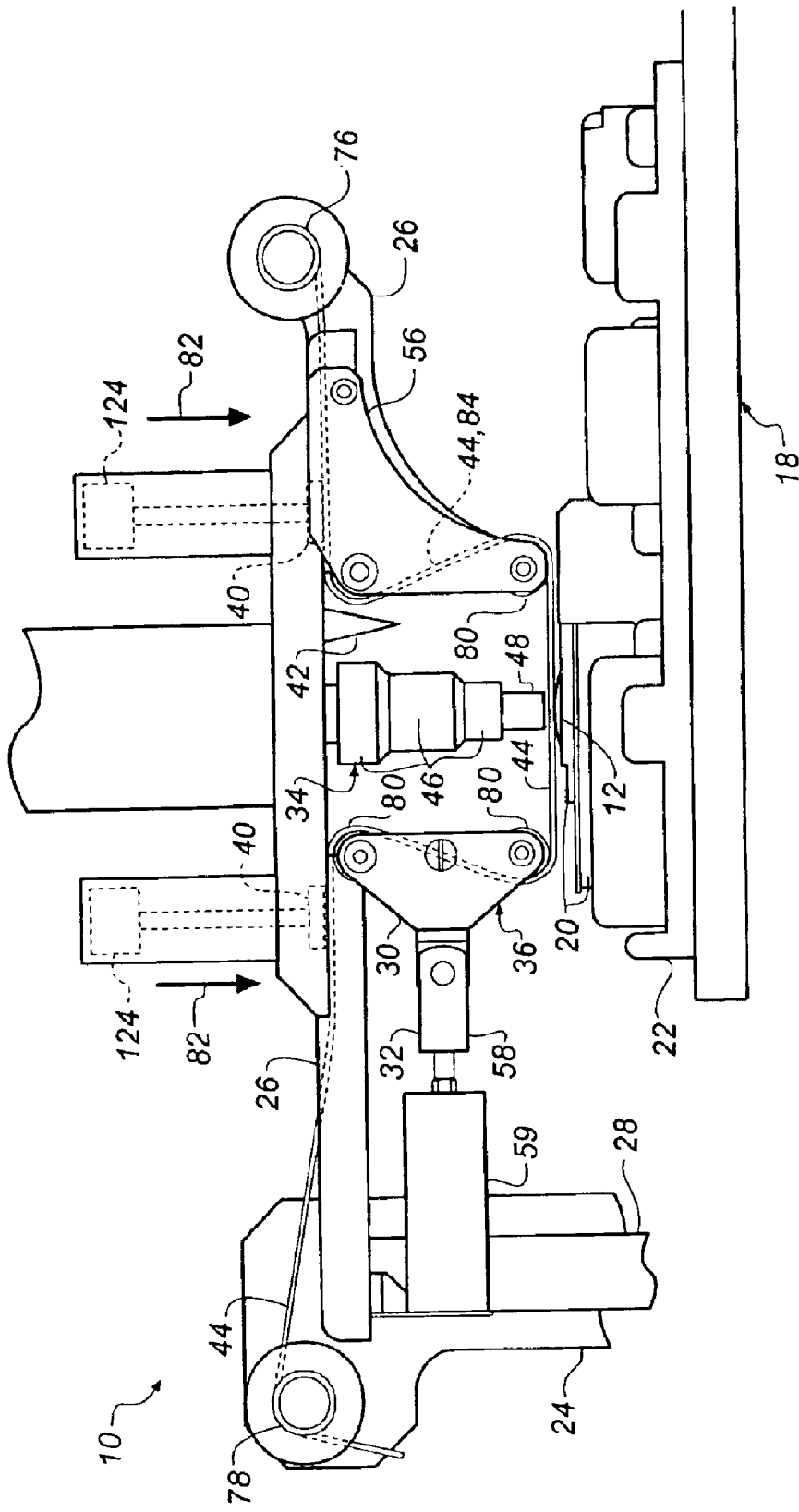
FIG. 5 is the same view as FIG. 4, except that the clamps are in the clamping position. The outfeed arm of the guide remains in the web tightening position. The carriage remains in the lowered position and the probe in the retracted position. The step of setting the clamps is indicated by a pair of downwardly directed arrows.

Referring to FIG. 5, the clamps 40 are next moved from the released position to the clamping position (indicated by arrows 82). The platen against which the web is clamped is part of the carriage underlying the clamps. This clamps off the portion of the web 44 in the web path 60 from the remainder of the web 44. The clamped off portion of the web 44 is isolated from the remainder, and that is, any movements of the web 44 between the clamps 40 are not transferred to the remainder of the web 44 that extends outward from the clamps 40.

Figure 12:
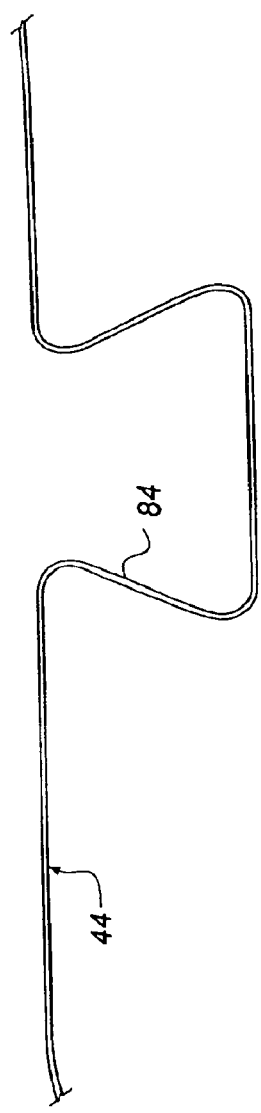
FIG. 12 is the same view as FIG. 4, except that only the web between the entrance and exit rollers is shown.
Figure 13:
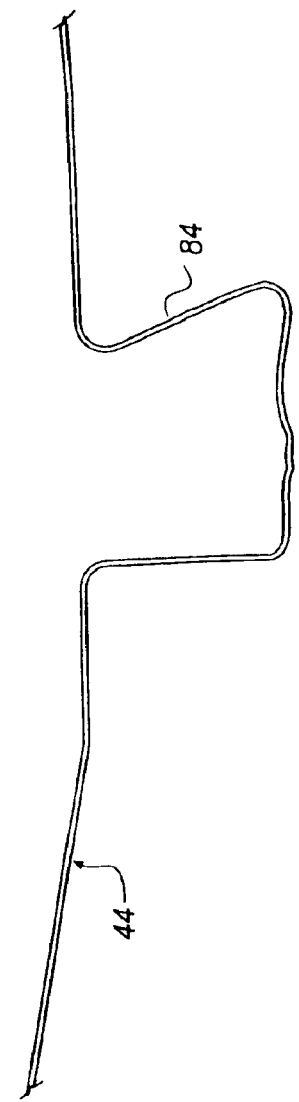
FIG. 13 is the same view as FIG. 6, except that only the web between the entrance and exit rollers is shown.

Referring now to FIG. 6, the outfeed arm 58 of the guide 36 is next moved from the web tensioning position to the web slackening position (indicated by arrow 85). As shown in FIGS. 12–13, this slackens the first segment of the web 44 that is underneath the probe 48. The probe 48 is moved (indicated by arrow 89) from the retracted position to the extended position, during or after the movement of the outfeed arm 58 to the web slackening position. In the extended position, the probe 48 contacts the first segment of the web 44 and holds the first segment against the lens 12. The movement of the probe 48 into the extended position can be simultaneous with the slackening of the first segment of the web 44 or can occur afterwards.

Figure 14:
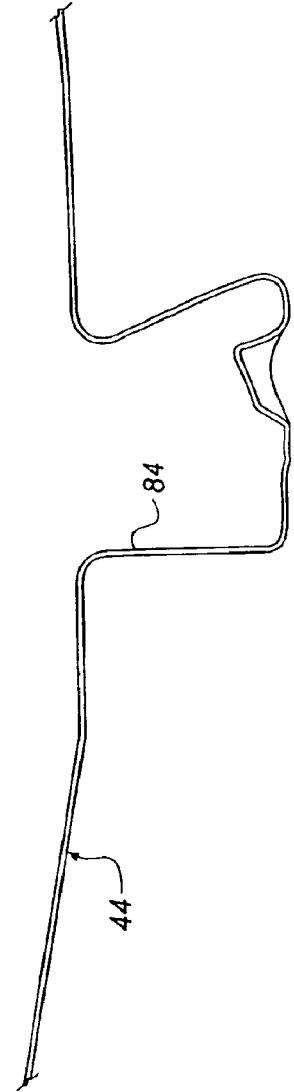
FIG. 14 is the same view as FIG. 7, except that only the web between the entrance and exit rollers is shown.

Referring now to FIG. 7, the probe 48 is next rotated back and forth about its axis of rotation 50 (indicated by double-headed arrow 91). This causes the segment of web 44 that is trapped between the probe 48 and the lens 12 to rub back and forth over the outer surface of the lens 12. The isolated portion 84 of the web 44 has sufficient length to allow this to occur due to the earlier slackening. During the pivoting of the probe 48, the web bunches first to one side, as shown in FIG. 14, and then to the other (not shown). The extent of pivoting and number of cycles of pivoting can be changed, as desired. A convenient degree of pivoting is 45 degrees in either direction of rotation and a convenient number of cycles is four cycles.

Referring now to FIG. 8, when the pivoting is completed, the outfeed arm 58 of the guide 36 is returned from the web slackening position to the web 44 tightening position. (This is indicated by arrow 88 in FIG. 8.) This pulls the isolated portion of the web 44 taut, returning the web 44 to the earlier tensioned condition. The carriage 26 remains in the lowered position and the probe 48 in the extended position, thus, the web 44 contacts the lens 12 during the retensioning of the web 44.

Figure 9:
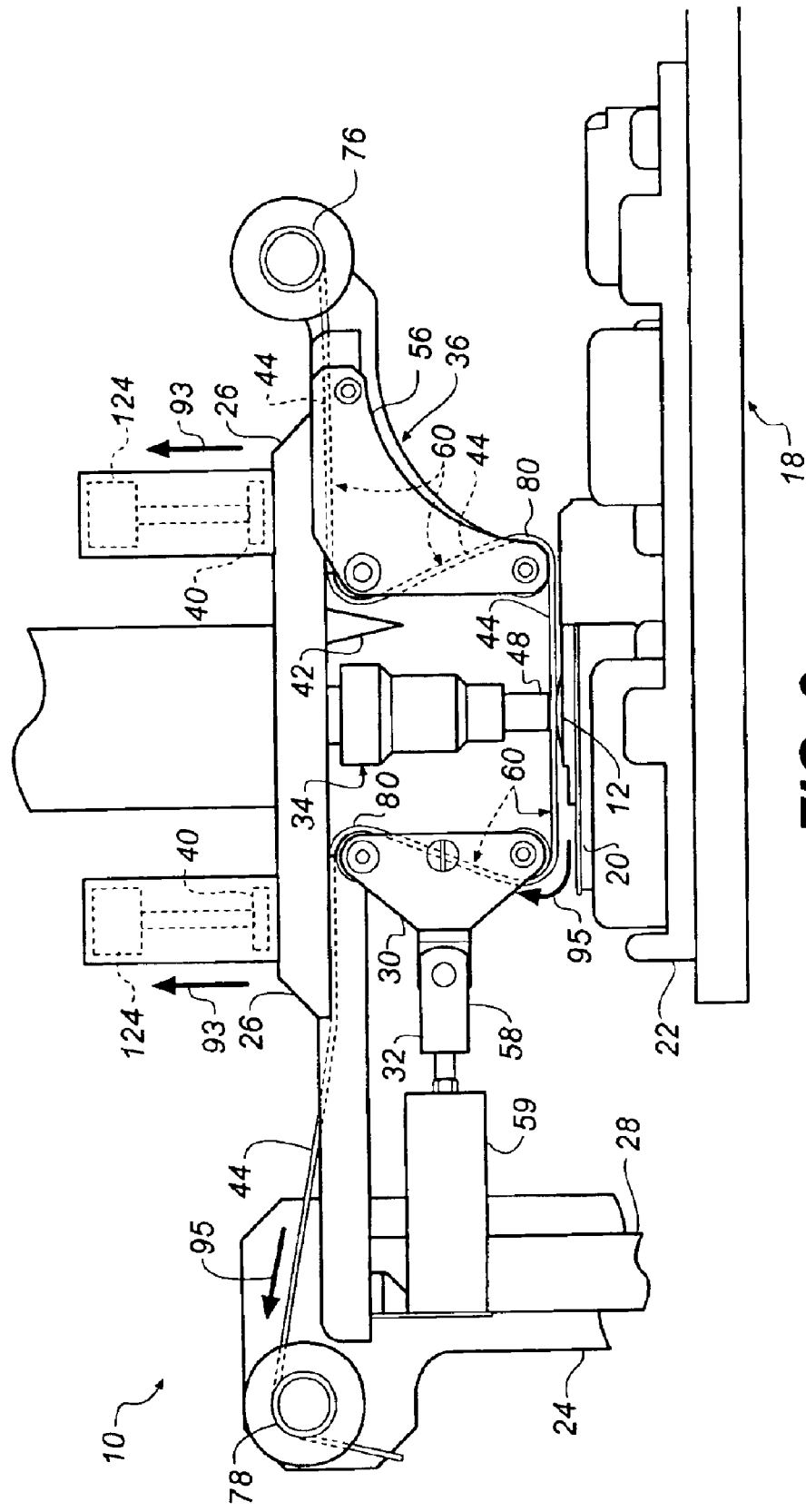
FIG. 9 is the same view as FIG. 8, except that the clamps are in the released position. The outfeed arm remains in the web tightening position. The probe remains in the extended position. The carriage remains in the lowered position. The movement of the clamps from the clamping position to the released position is indicated by a pair of upwardly directed arrows. The wiping movement of the web over the mounted lens is indicated by a curved arrow.

Referring now to FIG. 9, the clamps 40 are next released from the clamping position to the released position (indicated by arrows 93). The carriage 26 remains in the lowered position and the probe 48 in the extended position.

The web 44 is next moved forward (indicated by arrows 95) by the transport, bringing a dry segment of web 44 across the lens 12. This wiping of the lens 12 is continued as long as desired. A convenient amount of wiping uses a length of web 44 about equal to the length of the first segment. (The first segment, in this case is about 2 times the diameter of the probe 48.)

During the wiping, the probe 48 is held motionless relative to the lens 12, with the carriage 26 in the lowered position and the probe 48 in the extended position. The second segment of web 44, with which the lens 12 is wiped, is kept dry when the first segment is sprayed and thereafter. The second segment is, thus, clean and dry and can wipe any moisture from the lens 12. The web 44 is kept taut during the wiping.

Figure 10:
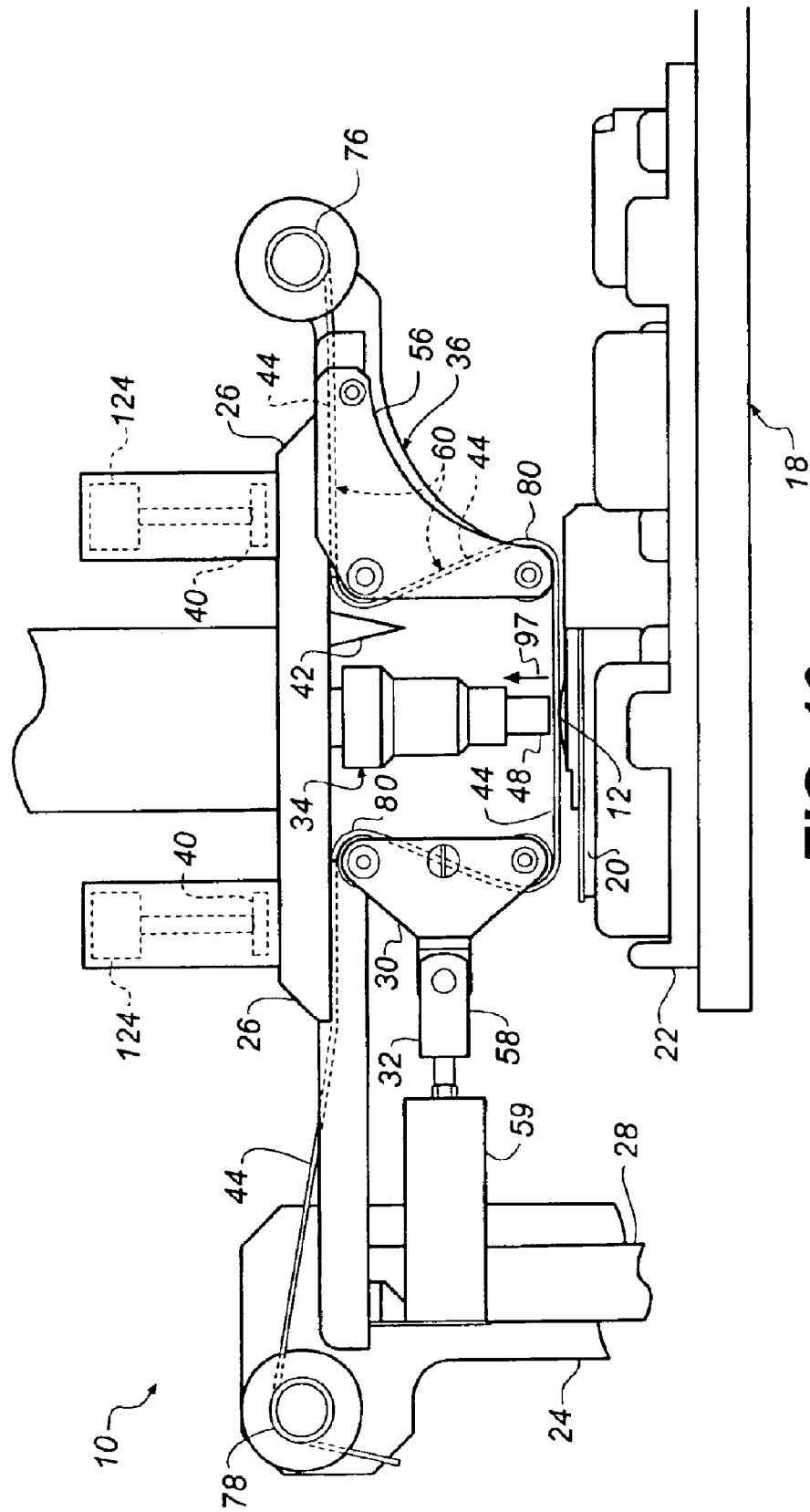
FIG. 10 is the same view is FIG. 9, except that the web is stopped. The movement of the probe to the retracted position from the extended position is indicated by an upwardly directed arrow.
Figure 11:
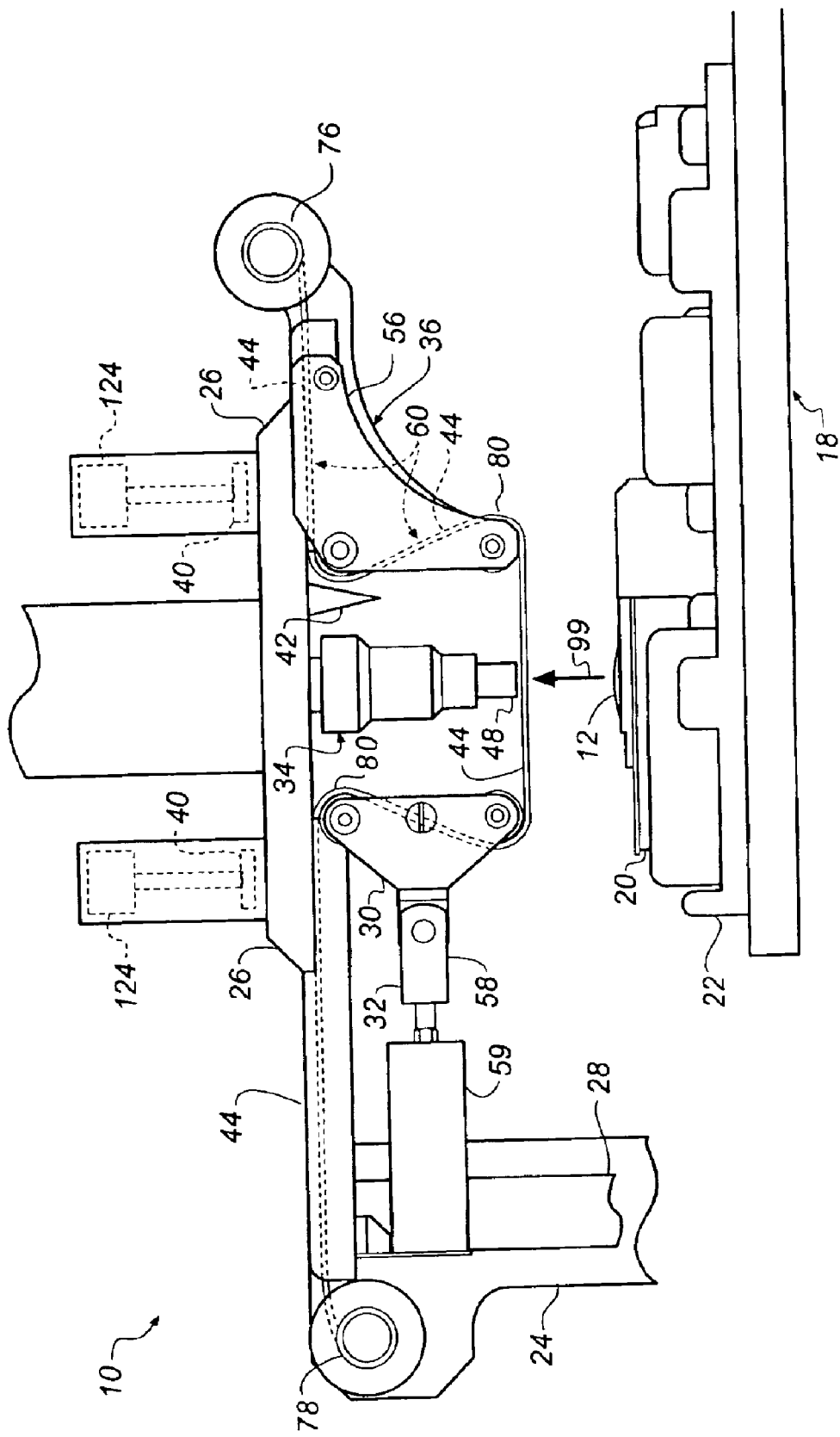
FIG. 11 is the same view as FIG. 10, except that the carriage is in the raised position and the probe is in the retracted position. The outfeed arm remains in the web tightening position and the clamps remain in the released position. The movement of the carriage from the lowered position to the raised position is indicated by an upwardly directed arrow.

Referring to FIGS. 10–11, when the wiping is completed, the cleaning probe 48 is retracted (indicated by arrow 97 in FIG. 10) to the retracted position and the carriage 26 is raised (indicated by arrow 99 in FIG. 11) to the raised position. The mounted lens 12 is moved onward by the transporter 18 and the process is repeated for the next mounted lens 12.

The sequencing and control of the steps of the method can be provided manually. It is preferred that the method be automatic using an appropriately programmed microprocessor to control all components or using mechanical logic to control components, or using combination of the two.

FIG. 2 illustrates an embodiment in which a motor 90 drives a first gearbox 92 that has a pair of pulleys 94. One of the pulleys 94 drives a belt 96 that operates the conveyor 18. The other one of the pulleys 94 drives a second belt 98 that operates a second gearbox 100. The second gearbox 100 has a first axle 102 that operates a first cam wheel 104. The carriage 26 has a follower 108 that rides on the first cam wheel 104. The carriage 26 rides up and down between the raised and lowered position, as the cam wheel 104 is rotated. The second gearbox 100 has a second shaft 110 that is connected to a second cam wheel 112. The rotation of the second cam wheel 112 moves a rod 114 that propels the outfeed arm 58 of the guide 36 between the web tensioning and web slackening positions. The second gearbox 100 has a third shaft 116 that is connected to a rotary switch box 118. The switch box 118 has a series of electrical switches (not shown) that are actuated by the rotation of the third shaft 116. (One or more gear trains or the like can also be provided as needed.) A first signal path 120 goes to a compressed air source 122. The compressed air source 122 provides compresses air to a pair of pneumatic cylinders 124 that operate the two clamps 40. The switch box 118 has a second signal path 126 to a motor 128 that drives the web transport 38. A third signal line 130 goes to a linear motor 52 and rotary motor 54 that operate the probe 48.

The invention has been described in detail with particular reference to certain preferred embodiments thereof, but it will be understood that variations and modifications can be effected within the spirit and scope of the invention.

What is claimed is:

1. A method for cleaning the front surface of a mounted lens, said method comprising the steps of:
   lowering a web into a lowered position against the lens;
   following said lowering, slackening a first segment of said web;
   following said slackening, rubbing said first segment against the lens;
   following said rubbing, pulling said web taut;
   maintaining said web in said lowered position during said slackening, rubbing, and pulling steps; and further comprising the steps of:
   prior to said slackening and after said lowering, moving a probe to a contact position against said first segment said first segment of said web, said probe, in said contact position, holding said first segment of said web against said lens; and
   maintaining said probe in said contact position with said first segment of said web during said slackening, rubbing, and pulling steps.

2. The method of claim 1 further comprising the steps of:
   following said pulling, wiping a second segment of said web against the lens;
   holding said web taut during said wiping;
   maintaining said web in said lowered position.

3. The method of claim 1 further comprising clamping off a portion of said web including said first segment prior to said slackening.

4. The method of claim 1 further comprising the steps of:
   following said pulling, wiping a second segment of said web against the lens;
   holding said web taut during said wiping.

5. The method of claim 2 further comprising wetting said first segment and keeping said second segment dry.

6. The method of claim 2 further comprising clamping off a portion of said web including said first segment prior to said slackening and releasing said clamping off prior to said wiping.

7. The method of claim 4 further comprising wetting said first segment and keeping said second segment dry.

8. The method of claim 5 wherein said wetting further comprises spraying a cleaning solution onto said first segment, prior to said lowering of said web.

9. The method of claim 5 further comprising pivoting said probe about an optical axis of said lens during said rubbing and holding said probe motionless relative to said lens, during said wiping.

10. The method of claim 7 wherein said wetting further comprises spraying a cleaning solution onto said first segment.

11. A method for cleaning the front surface of a mounted lens, said method comprising the steps of:
   lowering a first segment of a web into a lowered position against the lens;
   isolating a portion of said web including said first segment;
   moving a probe to a contact position against said first segment of said web, said probe, in said contact position, holding said first segment against said lens;
   following said lowering, isolating, and moving, slackening said first segment of said web;
   following said slackening, pivoting said probe;
   following said pivoting, pulling said web taut;
   maintaining said web in said lowered position and said probe in said contact position with said first segment of said web, during said slackening, pivoting, and pulling steps.

12. The method of claim 11 further comprising the steps of:
   following said pulling, wiping a second segment of said web against the lens;
   holding said web taut during said wiping;

maintaining said web in said lowered position.

13. The method of claim 12 further comprising holding said probe motionless relative to said lens, during said wiping.

14. The method of claim 13 further comprising wetting said first segment and keeping said second segment dry.

15. The method of claim 14 wherein said wetting further comprises spraying a cleaning solution onto said first segment, prior to said isolating.

* * * * *